United States Patent Office 2,925,039
Patented Feb. 16, 1960

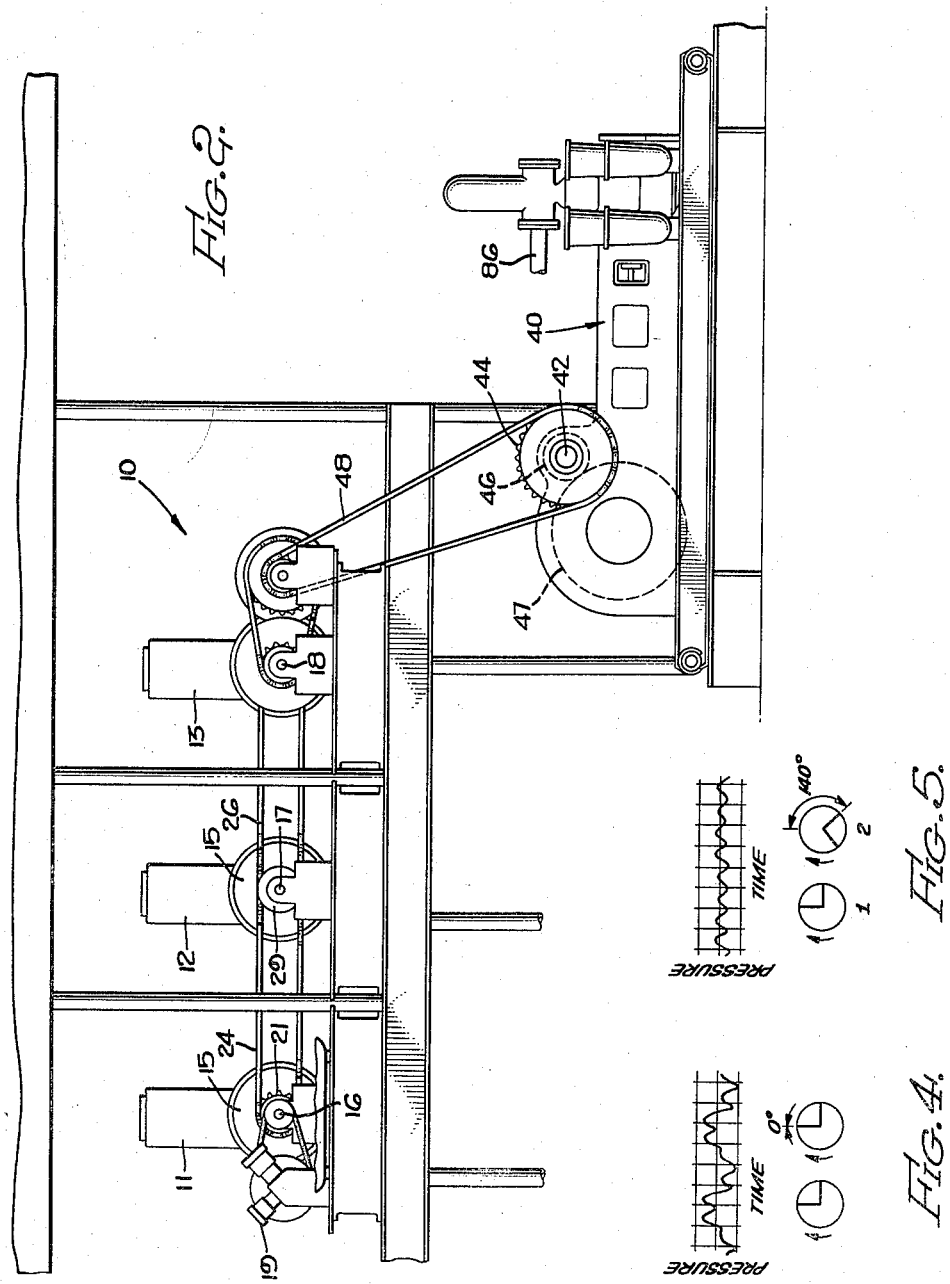

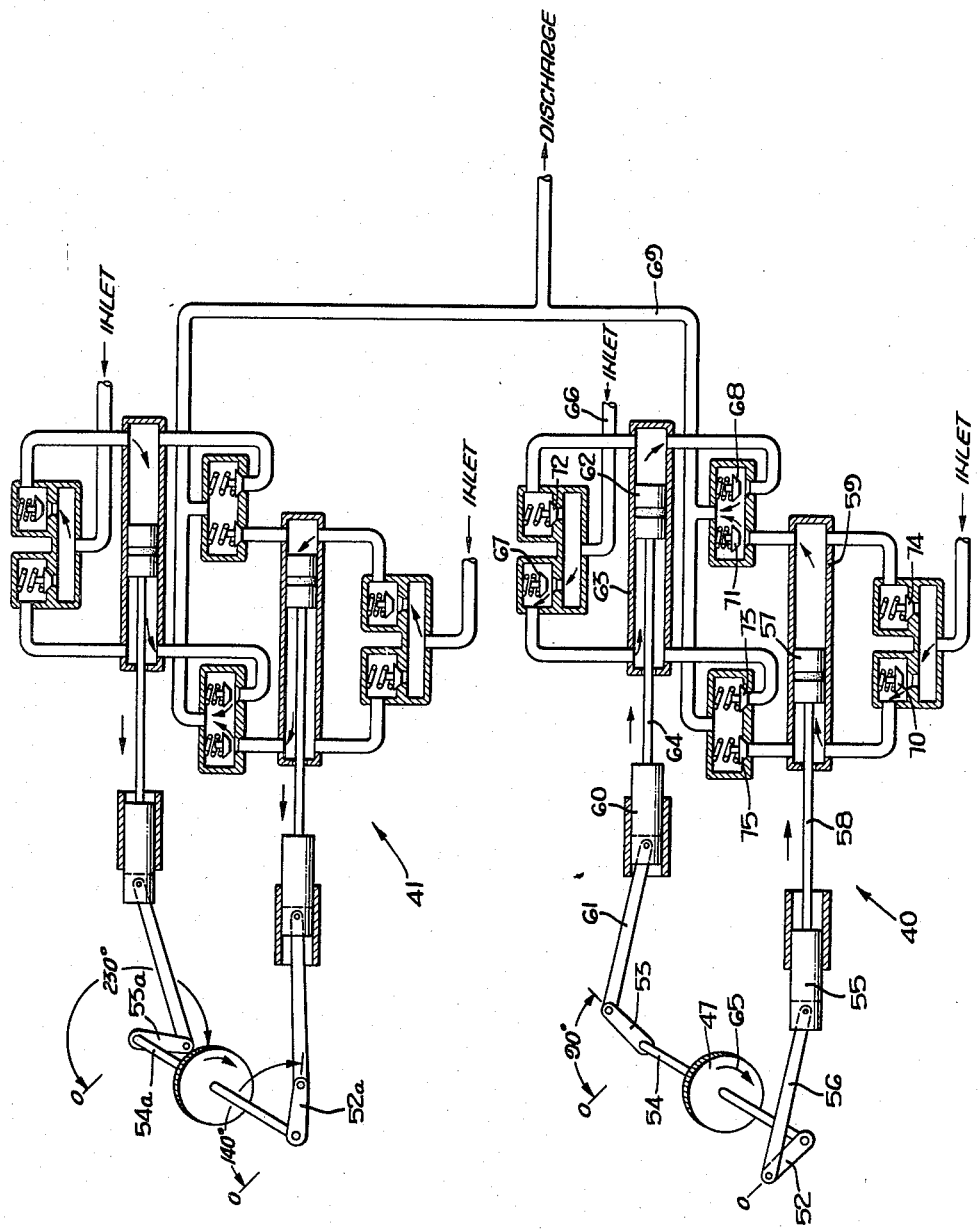

2,925,039
DRIVE FOR POWER PUMPS

Ambrose L. Harrington, Houston, Tex., assignor, by mesne assignments, to The National Supply Company, a corporation of Ohio Application February 1, 1955, Serial No. 485,545

2 Claims. (Cl. 103—4)

This invention relates to the drilling of wells by the rotary method and is particularly directed to improvements in the driving of duplex power pumps for circulating mud fluid.

In the rotary method of well drilling, mud fluid is pumped down through the interior of the rotating drill pump and emerges through holes in the bit. It then returns upward in the annulus outside the drill pipe and carries the bit cuttings to the surface. Present day demands for rapid drilling of deep holes requires high rates of flow of mud fluid at relatively high pressures. It is the practice to use power driven duplex pumps which are known in the art as "slush" pumps. These pumps each have a pair of double-acting reciprocating pistons which are driven through connecting rods from cranks fixed on a common crank shaft. One crank leads the other by 90°.

When high volumes are required, it is customary to employ two of these slush pumps discharging into a common header. It has been found that peak pressures and the range of pressure fluctuation in the discharge header pipe can be reduced if the crank shafts of the two pumps are connected in a certain phase relationship. When the pumps are of the conventional style, that is, the two cranks of each pump being spaced at 90° intervals, the phase relationship of the crank shafts should be such that the number one crank on one pump leads the number one crank on the other by 140°.

In accordance with my invention I provide a power driven construction for operating two duplex slush pumps simultaneously and wherein means are provided for driving each pump individually or for driving the pumps in parallel with other crank shafts synchronized so that one leads the other by 140° or by any other pre-selected angular relationship.

Accordingly the principal object of this invention is to provide novel means for driving a pair of duplex slush pumps to maintain their crank shafts in synchronized relationship.

Another object is to provide such a device which incorporates a change-speed transmission having a pair of axially aligned shafts together with spline clutch means for connecting the shafts at any desired angular relationship.

Other and more detailed objects and advantages will appear hereinafter.

In the drawings:

Figure 2 is a side elevation thereof.

Figure 3 is a diagrammatic illustration of the construction and operation of a pair of power driven duplex mud-circulating pumps.

Figure 4 is a graph showing typical pressure variations in a discharge header pipe when two duplex slush pumps operate in parallel and discharge into the same header pipe, the phase angle between the pump crank shafts being zero degrees.

Figure 5 is a view similar to Figure 4, the phase angle between the pump crank shafts being 140°.

Figure 1:
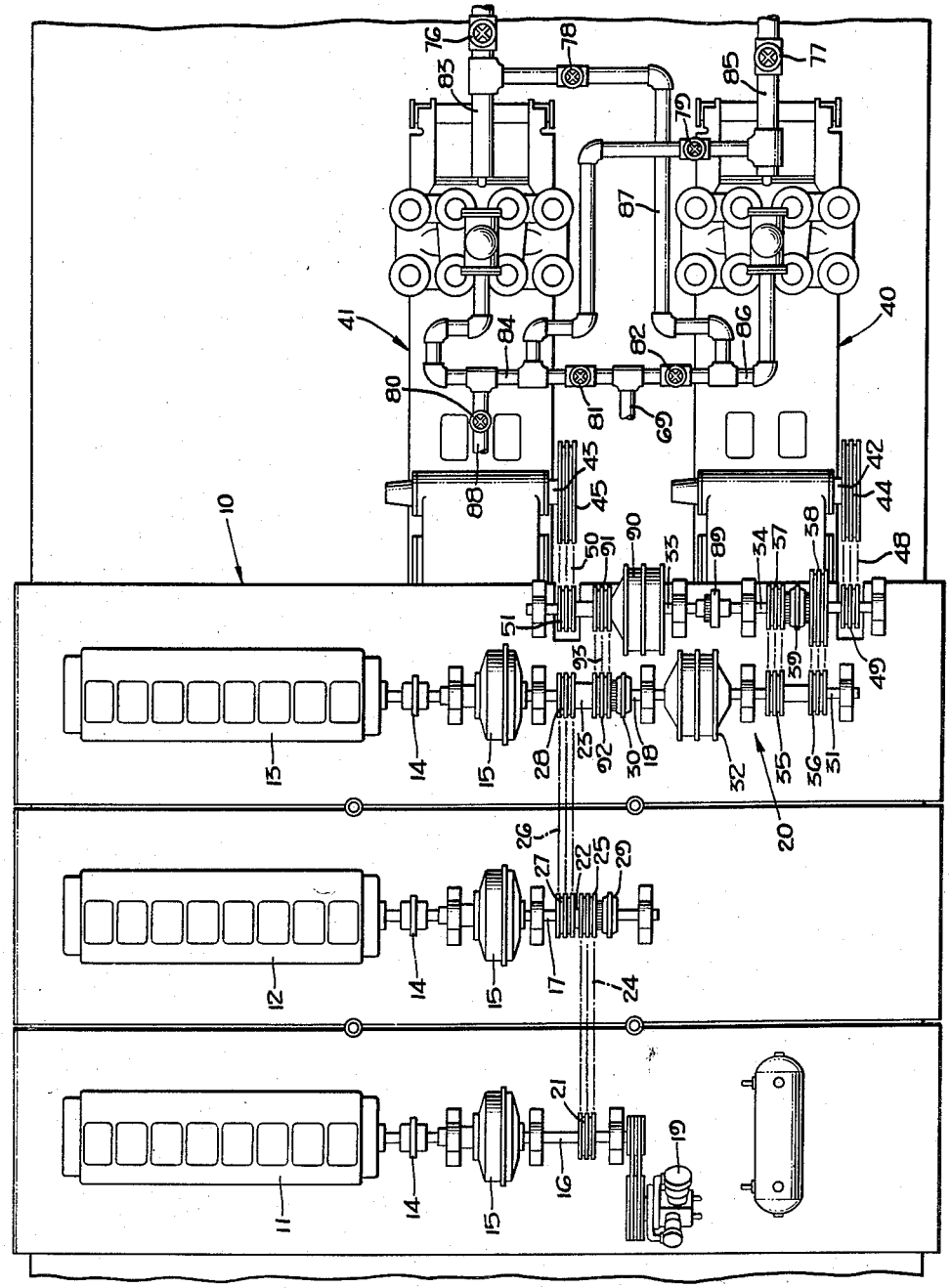
Figure 1 is a plan view showing a preferred embodiment of my invention.

Referring to the drawings:

The power plant 10 for driving the slush pumps of a rotary drilling rig includes a plurality of internal combustion engine units 11, 12, and 13. Each of these engine units is connected by a coupling 14 to drive a hydraulic coupling or torque converter 15. The power output shafts are designated 16, 17, and 18, respectively. If desired, the engine 11 may be connected to operate the air compressor 19.

Power compounding means are provided whereby the combined power of all three engines may be delivered to the change speed transmission generally designated 20. As shown in the drawings, this compounding means includes a sprocket 21 fixed on the shaft 16, a double sprocket member 22 rotatably mounted on the shaft 17 and a double sprocket member 23 rotatably mounted on the shaft 18. A chain 24 connects sprockets 21 and 25 and a chain 26 connects sprockets 27 and 28. A releasable clutch 29 is provided for connecting the double sprocket member 22 in driving relationship with the shaft 17. Similarly a releasable clutch 30 is provided for connecting the double sprocket member 23 in driving relationship with the shaft 18.

The change speed transmission includes a shaft 18 and the double sprocket member 23. It also includes the power input shaft 31 which is axially aligned with the shaft 18. The air operated friction clutch 32 is provided for connecting the line shafts 18 and 31 in driving relationship for rotation as a unit. The transmission 20 also includes the aligned power takeoff shafts. Sprockets 35 and 36 are fixed on the shaft 31 and connected by chains to drive sprockets 37 and 38 respectively which are rotatably mounted on the shaft 34. A clutch 39 is provided for connecting either of the sprockets 37 or 38 in driving relationship with the shaft 34.

Power driven duplex mud-circulating pumps 40 and 41 are placed side by side and are arranged to be driven from the change speed transmission 20. The pumps 40 and 41 may be duplex and are each provided with a pinion shaft 42, 43, having a drive sprocket 44, 45, fixed to one end thereof. A pinion gear 46 (see Figure 2) is fixed to the pinion shaft and meshes with a driven gear 47 fixed on the pump crank shaft. The driven gears and pump crank shafts are shown diagrammatically in Figure 3.

The pump sprocket 44 is driven by multiple width chain 48 from the sprocket 49 fixed on the power takeoff shaft 34. Similarly the pump sprocket 45 is driven through multiple width chain 50 from sprocket 51 fixed on power takeoff shaft 33. Sprockets 49 and 51 have the same pitch diameter and sprockets 44 and 45 have the same pitch diameter. Accordingly when the power takeoff shafts 33 and 34 turn at the same speed the pumps 40 and 41 are driven at the same speed.

As shown diagrammatically in Figure 3, the pump 40 has a first crank 52 and a second crank 53 fixed to a common crank shaft 54. The crank 52 is connected to the reciprocating guide 55 by means of the connecting rod 56. The guide 55 is in turn connected to the piston 57 by means of the piston rod 58. The piston 57 reciprocates within the cylinder 59. Similarly the second crank 53 is connected to the reciprocating guide 60 by means of the connecting rod 61. The piston 62 is reciprocated within the cylinder 63 by means of the piston rod 64 connected to the guide 60. Packing means, not shown, are provided at the location where the rods 58 and 64 enter the cylinders 59 and 63 respectively.

The crank arms 52 and 53 are angularly spaced by one-quarter revolution. This arrangement is conventional in power driven duplex pumps. When the crank shaft 54 is turned in the direction shown by the arrow 65, the pistons 57 and 62 reciprocate within their respective cylinders 59 and 63 but they do not move simultaneously because their cranks 52 and 53 are 90° out of phase. Accordingly the leading piston 62 moves from left to right and draws mud fluid from the inlet 66 through inlet valve 67 into the rear end of the cylinder 63. At the same time mud fluid in the forward end of the cylinder 63 is being discharged through valve 68 into the common header pipe 69.

Similarly the motion of the piston 57 from left to right in the cylinder 59 causes induction of mud fluid in the inlet valve 70 and discharge of mud fluid through the valve 71 to the header pipe 69. Motion of the piston 62 from right to left causes induction of mud fluid through the inlet valve 72 and discharge through valve 73 to the header pipe 69. Similarly the right to left motion of the piston 57 causes induction of mud fluid through valve 74 and discharge through valve 75. In brief, there are two inlet valves and two discharge valves for each piston and each piston is double-acting.

The second pump 41 is substantially the same in construction and operation as the first pump 40. The position of the parts in the operating cycle, however, is not identical to the first pump 40 but on the other hand the crank shafts 54 and 54a are preferably at an angle of 130° to 180°. The angle between the first crank 52a and the second crank 53a is 90° but as shown in the drawings the first crank 52a on pump 41 leads the corresponding first crank 52 on pump 40 by 140°. This relationship has been found by experiment to reduce the extent of pressure fluctuation in the discharge header 69 below the peak values which occur when the pumps are connected so that the first crank 52 and first crank 52a rotate in synchronism with a zero phase angle therebetween.

The pressure fluctuation in the header pipe 69 when the phase angle is zero below the pump crank shaft, is illustrated in Figure 4 of the drawings. When the phase angle is shifted to 140° as shown in Figure 5 the magnitude of the pressure variations in the discharge header 69 are significantly reduced. Reduction of the peak pressures reduces the stress on the various parts of the pump and reduces maintenance cost. Furthermore, the capacity of the pumps to deliver high volumes at high pressures are increased because of the smoothing out of the pressure fluctuations in the discharge pipes.

The piping arrangement shown in Figure 1 permits the pumps 40 and 41 to be connected for either series or parallel operation. When the inlet valves 76 and 77 are open and discharge valves 78, 79, and 80 are closed and when discharge valves 81 and 82 are open the pumps operate in parallel. Pump 41 draws fluid through inlet pipe 83 and discharges it through discharge piping 84 and through valve 81 to the discharge header 69. Similarly pump 40 draws mud fluid through inlet 85 and discharges it through pipe 86 and through valve 82 to the header pipe 69. The piping arrangement shown permits the pumps to be operated in series if desired. Thus when valves 76, 79, 80, and 82 are closed and valves 77, 78, and 81 are open, pump 40 discharges through pipes 86 and 87 and through valves 78 into the inlet pipe 83 of pump 41. The high pressure discharge of pump 41 then passes through pipe 84 to the header 69. In a similar manner valves 77, 78, 80, and 81, can be closed and valves 76, 79, and 82, open to cause the discharge of pump 41 to enter the inlet of pump 40. Thus either of the pumps may be the low pressure pump and the high pressure pump for series operations.

The valve 80 is provided for purposes of mud mixing through pipe 88. This valve 80 normally remains closed.

As shown in Figure 2, the pumps may be mounted at a low elevation so that the suction inlet lines may operate efficiently. The engine units 11, 12, and 13, may be mounted at a high elevation, if desired. An extension shaft, not shown, may be connected to the shaft 17 which is driven by engine unit 12 for the purpose of driving a third mud-circulating pump, not shown.

The desired angularity or phase relationship between the pump crank shafts is maintained by closing the spline clutch 89 (Figure 1). This spline clutch 89 enables the power takeoff shafts 33 and 34 to be solidly connected at any relative angular position for rotation as a unit. The drive sprocket 51 for pump 41 is fixed to the power takeoff shaft 33 and the drive sprocket 49 for the pump 40 is fixed to the power takeoff shaft 34.

An air operated friction clutch 90 serves to connect the sprocket 91 to the power takeoff shaft 33. This sprocket 91 is driven from the sprocket 92 via chain 93.

In operation the spline clutch 89 is closed and the pump crank shafts are thereby locked together for synchronous rotation at the chosen phase angle. The engine units 11, 12, and 13 drive the double sprocket member 23 and the shaft 18. When the spline clutch 30 is closed, the member 23 and shaft 18 rotate as a unit. The power takeoff shaft 33 does not turn however until the friction clutch assembly 32 or friction clutch assembly 90 is closed. If the clutch assembly 90 is closed the sprocket 91 is clutched to the power take off shaft 33 and both pumps are driven through chain 93. If the friction clutch 90 remains open and if friction clutch 32 is closed, the shaft 31 is driven from shaft 18 and power is supplied to the power takeoff shaft 34 through sprockets 35, 37 or sprockets 36, 38, depending on the position of spline clutch 39.

Having fully described my invention, it is to be understood that I do not wish to be limited to the details herein set forth but my invention is of the full scope of the appended claims.

I claim:

1. For use with a multiple engine power plant and a pair of hydraulically connected power-driven mud-circulating pumps each having a plurality of reciprocating pistons driven from a common crankshaft, and each pump having a rotary drive member connected through a positive drive connection to turn its respective crankshaft without slippage, the improvement comprising, in combination: a pair of shafts, means including a friction clutch engageable with one of the shafts for driving said shaft from the power plant, means including a second friction clutch operatively connected to the other of the shafts for driving said other shaft from the power plant, means including a positive clutch adapted to connect said shafts at a desired relative angular position for rotation as a unit, positive drive means connecting one of said shafts to one of said rotary drive members for driving said rotary drive member without slippage therebetween, positive drive means connecting the other of the shafts to the other of said rotary drive members for driving the other said rotary drive member without slippage therebetween, whereby the crankshafts of both pumps may be driven simultaneously at identical speeds and at constant relative angular position regardless of slippage of either of said friction clutches.

2. For use with a multiple engine power plant and a pair of hydraulically connected power-driven mud-circulating pumps each having a plurality of reciprocating pistons driven from a common crankshaft, and each pump having a rotary drive member connected through a positive drive connection to turn its respective crankshaft without slippage, the improvement comprising, in combination: a pair of axially aligned shafts, means including a friction clutch engageable with one of the shafts for driving said shaft from the power plant, means including a second friction clutch operatively connected to the other of said shafts for driving said other shaft from the power plant, means including a positive clutch adapted to connect said shafts end-to-end at a desired relative angular position for rotation as a unit, positive drive means connecting one of the shafts to one of said rotary drive members for driving said rotary drive member without slippage therebetween, positive drive means connecting the other of the shafts to the other of said rotary drive members for driving the other said rotary drive member without slipping therebetween, whereby the crankshafts of both pumps may be driven simultaneously at identical speeds and at constant relative angular position regardless of slippage of either of said friction clutches.

References Cited in the file of this patent

UNITED STATES PATENTS

| | | |
|---|---|---|
| 1,652,026 | Loffler | Dec. 6, 1927 |
| 2,096,150 | Walne | Oct. 19, 1937 |
| 2,282,597 | Archer | May 12, 1942 |
| 2,488,069 | Spalding | Nov. 15, 1949 |
| 2,594,064 | O'Leary | Apr. 22, 1952 |
| 2,674,188 | Young | Apr. 6, 1954 |
| 2,694,978 | Berry | Nov. 23, 1954 |